United States Patent [19]

Conigliaro et al.

[11] Patent Number: 4,849,733
[45] Date of Patent: Jul. 18, 1989

[54] SEAT BELT INDICATOR SYSTEM

[76] Inventors: Thomas S. Conigliaro; Samuel J. Coniliaro, both of 26 Theodore Rd., Huntington, Conn. 06484

[21] Appl. No.: 264,905
[22] Filed: Oct. 31, 1988
[51] Int. Cl.⁴ .............................................. B60Q 11/00
[52] U.S. Cl. ................................................ 340/457.1
[58] Field of Search ........................... 340/52 E, 687; 307/10 LS, 10 SB

[56] References Cited
U.S. PATENT DOCUMENTS

| | | | |
|---|---|---|---|
| 3,074,055 | 1/1963 | Rudolph et al. | 340/52 E X |
| 3,112,467 | 11/1963 | Benning | 340/52 E |
| 3,147,819 | 9/1964 | Keleher | 340/52 E X |
| 3,504,336 | 3/1970 | Boblitz | 340/52 E |
| 3,875,556 | 4/1975 | Beaird | 340/52 E |
| 3,962,677 | 6/1976 | Miesterfeld et al. | 340/52 E |

Primary Examiner—Joseph A. Orsino
Assistant Examiner—Brian R. Tumm
Attorney, Agent, or Firm—Perman & Green

[57] ABSTRACT

An electrical system for providing an audible or visible warning and interior and exterior visible displays indicating whether the occupants of a motor vehicle have fastened their seat belts, in compliance with legal requirements and/or the will of the driver. The system involves a plurality of circuits each of which is associated with a driver's seat sensor switch, with a seat belt latch and with an interior display panel, and at least some of which are also associated with exterior display lights. Each said circuit has a seat belt latch for closing or opening said circuit, when the driver's seat sensor switch is closed, to change the condition of a light at a corresponding position on the interior display panel and, for at least the front seat belts, to change the condition of a corresponding exterior display light. The system also includes a warning circuit including an audible or visible warning signal which is activated when the driver's seat sensor switch is closed and the ignition is turned on, and can only be deactivated by the driver latching his or her seat belt.

8 Claims, 2 Drawing Sheets

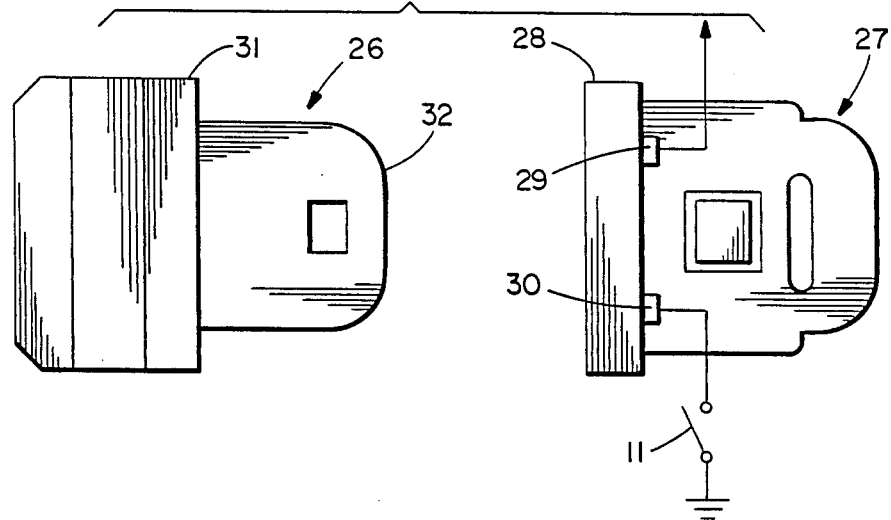

SEAT BELT INDICATOR SYSTEM

BACKGROUND OF THE INVENTION

The present invention relates to an indicator system for alerting the driver of a motor vehicle and also alerting external observers, such as law enforcement officers, whether at least the driver and certain occupants of the vehicle have their seat belts fastened.

Seat belts are required by law to be installed in all modern automobiles for the safety of the occupants. Since many people are hesitant or resistant to wearing seat belts, many automobiles were provided with audible warning signal devices which sound until the driver's seat belt is fastened. Since many car owners disconnected such devices rather than using their seat belts, more recent automobiles are now provided with a temporary audible warning signal circuit which reminds a driver to fasten the seat belt but which silences after a few seconds time, whether or not the driver complies.

In view of the mounting evidence that seat belts do protect occupants against more severe injuries in serious automobile accidents, most states have enacted laws mandating the wearing of seat belts by at least the occupants of the front seat of an automobile. Failure to comply subjects the driver to a fine for self and any minor occupants of the vehicle. Other occupants are subject to a fine for their own noncompliance.

Also, it is advantageous to the liability of the driver that all occupants are properly secured by their seat belts because the driver is responsible for their safety. An injured occupant can seek recovery from the driver for injuries sustained in an accident, and the costs involved increase with the severity of the injuries.

For the foregoing reasons, it is advantageous for the driver of an automobile to know that each of the occupants is securely belted in place before moving the vehicle. Generally, a reasonably prudent driver will merely request compliance and will assume that all occupants have fastened their seat belts. However, such may not be the case.

Moreover, it is advantageous for law enforcement officers to be able to observe from outside the vehicle whether the driver and other front seat occupants of the vehicle are wearing their seat belts. Currently, it is impossible, particularly in the case of lap belts, to see from a distance whether such belts are fastened. Even if a vehicle is stopped by an officer, the occupants can fasten their seat belts before the officer can approach the vehicle and visually inspect the positions of the seat belts.

It has been proposed to furnish automobiles with a variety of systems which detect the weight of an occupant in a particular seat and, in the case of unfastened seat belts, to provide an audible, visual or ignition-lock signal for the protection of the driver and occupants. Some proposed systems, such as that of U.S. Pat. No. 3,875,556, even provide rear external display lights which are illuminated by the driver and extinguished by the fastening of the seat belts by the occupants. Any illuminated light is visible to an officer and indicates an infraction unless the driver has erroneously illuminated lights for unoccupied seat positions within the vehicle.

While the proposed systems have merit in accomplishing the desired results, they generally are impractical, expensive, subject to breakdown and/or require the operator to perform certain manual steps rather than being automatic. In the system of U.S. Pat. No. 3,875,556 for example, the driver must actuate six switches, one for each of the occupied positions in the vehicle, including his own, and also actuate a totalizer switch which provides a visible internal and external indication of the number of occupants. If the driver forgets to actuate the occupants switches, the system is inoperative since no interior of exterior lights become illuminates, and the vehicle appears to be in compliance with the law to an officer viewing the exterior of the vehicle.

SUMMARY OF THE INVENTION

The present invention provides a simple automatic visual and/or audible interior display system for alerting the driver of an automobile whether the driver and the occupants of the vehicle have their seat belts fastened, and a simultaneous automatic visual exterior display system for informing law enforcement officers whether at least the front seat occupants visible within the vehicle are wearing seat belts as required by law. The present system comprises a normally open driver-sensor switch and a plurality of normally open circuits, each including a display light such as a light-emitting diode (LED) in a predetermined position on an interior display panel visible to the driver, and a circuit-closure switch associated with a corresponding seat belt latch which is adapted to close the circuit and to illuminate the LED, thereby providing a visual and/or audible indication to the driver whether the driver's seat belt and the seat belts at each of the other occupied positions of the vehicle are fastened. In addition, the circuits for at least the two or three front seat positions of the vehicle each include an exterior rear display light which is simultaneously illuminated, with the corresponding interior LED, to provide an externally-visible indication that the visible front seat occupants of the vehicle have their seat belts fastened at all times. The driver-sensor switch is concealed and inaccessible so as to enable the system only when the driver is present, the driver's seat belt is buckled and the ignition is on.

BRIEF DESCRIPTION OF THE DRAWINGS

FIG. 2 is an elevational view of a seat belt buckle or latch incorporating a magnetic switch means, according to one embodiment of the invention.

DETAILED DESCRIPTION OF THE INVENTION

Figure 1:
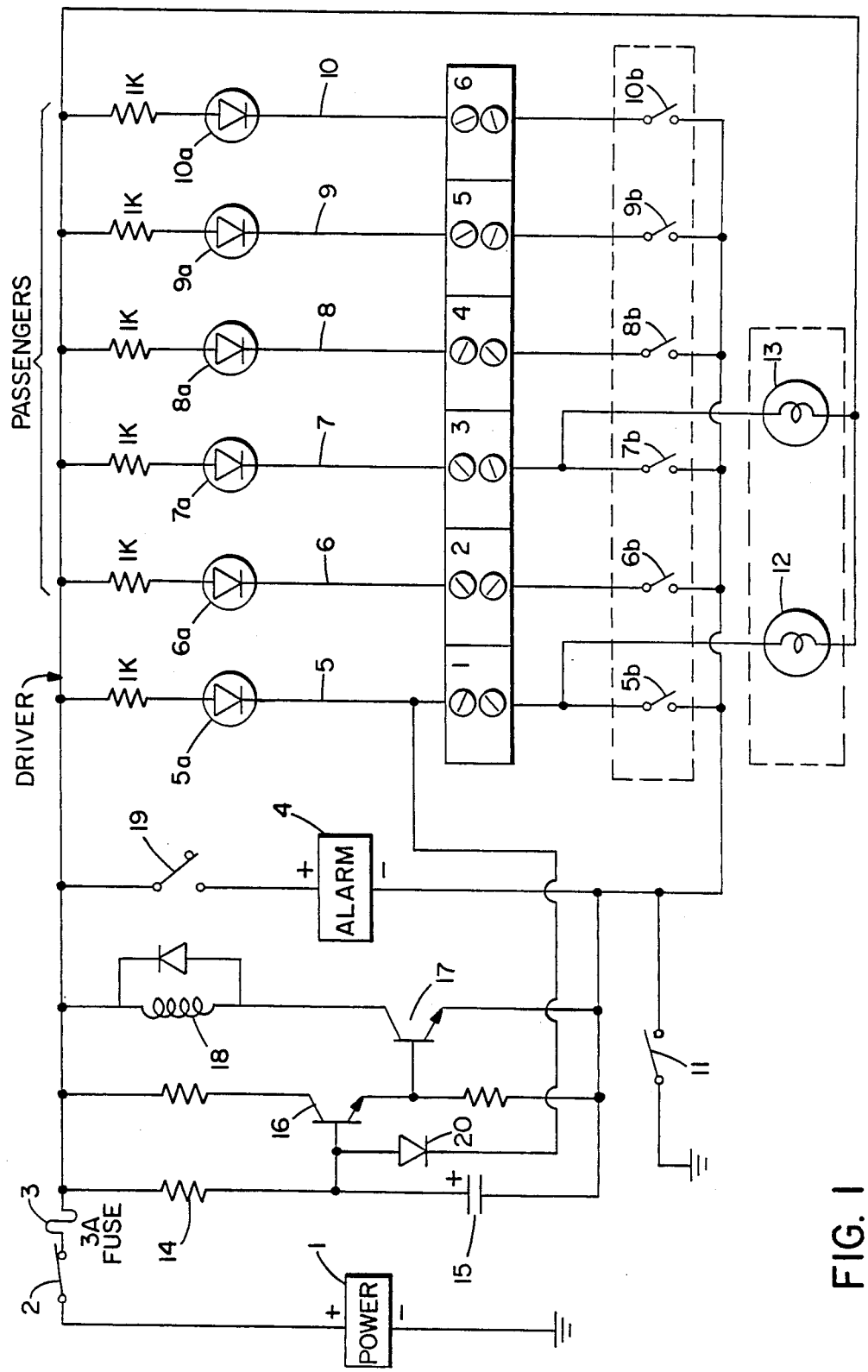
FIG. 1 is an electrical schematic diagram of one embodiment of the novel seat belt indicator system of the present invention.

Referring to FIG. 1, the normally-open circuit thereof comprises a power source or battery 1, an ignition switch 2, fuse or circuit breaker 3, alarm 4, plurality of six normally-open passenger circuits 5, 6, 7, 8, 9 and 10, and a driver-sensor switch 11 to ground. In the embodiment of FIG. 1, passenger circuit 5 is the driver's circuit and includes an externally-visible light 12, and passenger circuit 7 is the right front passenger circuit and includes an externally-visible light 13.

Each of the passenger circuits 5 to 10 includes a resistor, and internally-visible light-emitting diode 5a to 10a, respectively, and a conductive seat belt including a latch 5b to 10b, respectively.

The entire circuit remains open to ground unless the driver sensor switch is activated to closed position by the weight of a driver present in the driver's seat.

Thereafter the circuit can be enabled by the closing of the driver's circuit 5, which requires the latching of the driver's seat belt latch 5b to disable the alarm 4. Unless the seat belt latches 5b and 7b are closed, the external lights 12 and 13 will not illuminate, providing a clear exterior signal that the driver has not fastened the driver's seat belt, if light 12 is not illuminated, and providing a similar clear signal that any passenger visible in the right front passenger's position has not fastened that seat belt latch if light 13 is not illuminated. If desired an external light can be included for each of the six passenger positions so long as they are mounted or numbered to provide a clear external indication of the particular passenger position represented by each. The externally-visible lights 12 and 13, and other passenger circuit lights if present, are mounted at the rear of the vehicle, facing rearwardly, to indicate to a person outside and behind the vehicle, such as law enforcement officer, whether the driver and/or other occupants of the vehicle have fastened their seat belts.

The internally-visible LED lights 5a to 10a, respectively, are mounted within the vehicle in a location in which they are clearly visible to a driver seated in driving position, such as on or in the dashboard of the vehicle. Also, these lights are positioned or numbered so that the seat positions represented by each are clearly apparent to the driver. Thus, for example, if passenger circuit 8 represents the left rear seat position, immediately behind the driver, and that position is occupied and LED 8a is not illuminated, the driver is informed that latch 8b has not been closed and can instruct the occupant of that position to fasten that seat belt.

The activation and operation of the circuit of FIG. 1 is as follows. When a driver enters the vehicle and sits in the driver's seat, the weight of driver closes mechanical switch 11. When the driver turns on the ignition switch 2, power from the battery charges a capacitor 15 through a resistor 14 to turn on transistors 16 and 17 and energize relay coil 18. This takes about 8 or 10 seconds. When coil 18 is energized the relay contact 19 closes to energize the alarm 4, which alerts the driver and other occupants to fasten their seat belts. Alarm 4 can be a buzzer, a flashing light or a "talking" module.

When the driver's seat belt is fastened the alarm 4 is deenergized due to the completion of circuit 5 to ground, thereby discharging capacitor 15 through diode 20 and seat belt latch 5b. The completion of circuit segment 5 also illuminates the internal LED 5a and the external light 12. The other LED lights 6a to 10a and the external light 13 will remain non-illuminated unless the appropriate latch 6b to 10b are fastened. This permits the driver to observe that other occupants within the vehicle have not fastened their seat belts and to identify which seat positions are involved, so as to specifically request compliance before the vehicle is put into motion. Moreover, it permits a person, such as a law enforcement officer, outside and behind the vehicle to view the rear lights 12 and 13 and be informed by the illumination condition thereof whether the driver and front seat passenger, if visible within the vehicle, have their seat belts fastened.

The rear lights 12 and 13 are mounted either within the vehicle, such as at the rear window, or externally, such as on the rear bumper or trunk or other location, facing rearwardly so as to be clearly visible to anyone outside the vehicle looking in their direction. Preferably, they are provided with amber or blue lenses to distinguish them from the red lights present on the vehicle, i.e., parking lights, stop lights, directional, etc. FIG. 2 illustrates the use of a magnetic switch as a means for completing the circuits through each of the seat belts present in the vehicle, according to one embodiment of the present invention. Since all of the seat belts and latches present within the vehicle are similar, FIG. 2 is representative of each of them.

Thus, the conventional seat belt latch of FIG. 2 comprises a male section 26 and a female section 27, each of which is connected to a fabric belt portion secured to the vehicle. The female latch section 27 has secured thereto, adjacent and parallel to the receiving slot therein, a conventional magnetic switch 28 which is normally open, i.e., the spaced contacts 29 and 30 thereof are normally disconnected from each other. The contact 29 of each seat belt latch is connected by a wire to a different LED, 5a to 10a of the LED panel, which corresponds to the location position of the seat belt within the vehicle. Contact 30 of each latch is connected to ground, through the drivers sensor switch 11, as shown by FIG. 1.

The male latch section 26 has secured thereto a companion magnet 31, adjacent and parallel the end of the insert tongue 32, positioned so as to be moved adjacent or in parallel contact with the magnetic switch 28 of the female latch section 27 when the tongue 32 is inserted within the opening in the section 27 to fasten the sections 26 and 27 to each other during the normal step of fastening the seat belts. This causes a closing of the circuit including each of the fastened seat belts, i.e., current is caused to flow from the power source to contact 29 and through contact 30 and driver's seat switch 11, if closed, to ground, thereby illuminating the corresponding LED 5a to 10a and the corresponding rear light, 12 and 13 for the front seat positions, providing the driver with a clear visual indication that certain seat belts or all seat belts are properly fastened, and providing a clear exterior rear visual indication that certain or all front seat belts are properly fastened, as required by law.

The only act required of the driver is to make a visual inspection of the positions of any occupants within the automobile, i.e., through the rear view mirror, and correlate this information to the display in the dashboard panel. This removes any doubt as to whether all occupants are properly secured by their seat belts and enables the driver to refuse to place the vehicle in motion until all belts have been secured. Moreover, if any of the seat belts are unfastened thereafter, the driver will be so informed when the corresponding LED extinguishes or ceases emitting light.

The novel system of the present invention also comprises an audible signal means 4 to prevent the driver from forgetting to fasten his seat belt and thereby failing to observe the LED display panel for all occupants. Thus, the normally open circuit through the driver's seat belt switch 5b is associated with an audible signal means 4, actuated by insertion and turning of the ignition key to "on" position, so that the audible signal will not cease until the driver's seat belt is fastened to discharge capacitor 15 through diode 20 and interrupt the buzzer circuit. LED 5a is illuminated by the fastening of switch 5b and draws the attention of the driver to the condition of the LEDS.

While the use of magnetic switch means on the seat belt latches are preferred since they can be added in simple manner to existing conventional seat belt latches, it will be apparent that other switching means, such as mechanical devices, can be incorporated internally within latches manufactured for the present purposes.

Preferably the present seat belt circuits 5 to 10 are normally open so that the indicator LEDS, 5a to 10a, and the rear lights 12 and 13 are ignited only when the seat belts are fastened to close the circuits. This provides a "no light" condition for unoccupied seats of the vehicle. However, it will be clear to those skilled in the art that the objects and advantages of the present invention will also be accomplished in cases where the circuits are normally closed and the fastening of the seat belts opens or breaks the circuits to extinguish the LEDS and rear lights, provided that the driver and law enforcement officers are aware of the correlation of the condition of the LEDS and rear lights and the condition of the seat belts.

Variations and modifications in the present invention will be apparent to those skilled in the art within the scope of the present claims.

We claim:

1. A system for providing a clear visual indication to the driver of a vehicle whether the occupants thereof have their seat belts fastened and for simultaneously providing a clear visual indication to persons outside and behind the vehicle whether at least the occupants visible in the front seat of the vehicle have their seat belts fastened, said system comprising an electrical circuit between a power source, a driver's seat sensor switch and ground for each of the seat belts present in the vehicle, each said circuit including said driver's seat sensor switch and a switch means associated with the latch means of the seat belt for said circuit for closing or opening said circuit when said driver's seat sensor switch is closed and the latch means for said circuit is fastened, and each said circuit including an interior light source which becomes illuminated or extinguished when said circuit is closed to provide a visual indication thereof, all of said interior light sources being assembled in a location within the vehicle in clear view to the driver, at least the circuits for each of the front seat belts also including a second light source which also becomes illuminated or extinguished when each of said circuits is closed, said second light sources being located in positions which are clearly visible from outside and behind the vehicle to provide an externally-visible indication of whether at least the occupants visible in the front seat positions of the vehicle have their seat belts fastened, said electrical circuit also comprising a normally-closed warning circuit including an audible or visible warning means which is activated when the driver's seat sensor switch is closed and the vehicle ignition is turned on and is deactivated by the latching of the driver's seat belt, said warning circuit further comprising a relay having contacts which close automatically when the ignition is turned on to energize said relay and activate said warning means to warn the driver to latch his seat belt and to observe the condition of said interior light sources, and a capacitor which is discharged by the latching of the driver's seat belt to deenergize said relay, open said contacts and deactivate said warning means.

2. A system according to claim 1 in which all of said interior light sources are arranged in view of the driver in locations corresponding to the locations of the seat belts within the vehicle with which they are associated.

3. A system according to claim 2 in which said interior light sources are mounted on the dashboard of the vehicle, in front of the driver.

4. A system according to claim 1 in which said interior light sources are light-emitting diodes.

5. A system according to claim 1 in which said second light sources are mounted within the vehicle, facing rearward and visible from the rear of the vehicle.

6. A system according to claim 1 in which said second light sources are incandescent lamps.

7. A system according to claim 1 in which each said switch means comprises a magnetic switch.

8. A system according to claim 1 in which said driver's seat sensor switch is a normally open switch in the driver's seat which is closed by the weight of a driver in said seat.

* * * * *